United States Patent
Sapkota et al.

(10) Patent No.: US 8,611,270 B1
(45) Date of Patent: Dec. 17, 2013

(54) DYNAMIC WIRELESS VLAN IP MULTICAST DISTRIBUTION

(75) Inventors: Bhawani Sapkota, Fremont, CA (US); Tak Ming Francis Pang, Fremont, CA (US); Gong Cheng, Santa Clara, CA (US); Kalyan R. Dharanipragada, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1259 days.

(21) Appl. No.: 11/624,988

(22) Filed: Jan. 19, 2007

(51) Int. Cl.
*H04H 20/71* (2008.01)
*H04L 12/28* (2006.01)
*H04M 1/00* (2006.01)
*H04L 29/06* (2006.01)

(52) U.S. Cl.
USPC ......... 370/312; 370/390; 713/163; 455/552.1

(58) Field of Classification Search
USPC ............... 370/312, 310.2, 338, 328, 390; 455/422.1, 456.3, 463, 414.1–414.4, 455/426.1, 552.1; 713/163; 379/335.1
See application file for complete search history.

(56) References Cited

U.S. PATENT DOCUMENTS

| | | | |
|---|---|---|---|
| 5,959,989 A * | 9/1999 | Gleeson et al. | 370/390 |
| 6,307,837 B1 | 10/2001 | Ichikawa et al. | |
| 6,839,348 B2 | 1/2005 | Tang et al. | |
| 6,847,620 B1 * | 1/2005 | Meier | 370/328 |
| 7,606,232 B1 * | 10/2009 | Ruben et al. | 370/392 |
| 2003/0165140 A1 * | 9/2003 | Tang et al. | 370/393 |
| 2005/0025160 A1 * | 2/2005 | Meier et al. | 370/395.53 |
| 2005/0226257 A1 * | 10/2005 | Mirzabegian et al. | 370/401 |

* cited by examiner

*Primary Examiner* — George Eng
*Assistant Examiner* — Marcus Hammonds
(74) *Attorney, Agent, or Firm* — Tucker Ellis LLP

(57) ABSTRACT

In one embodiment, a system that employs IGMP (Internet Group Management Protocol) snooping and client tracking to forward an IP multicast flow between a distribution (e.g., wired or backbone) network and a wireless network without the need to configure a VLAN on either infrastructure. A single IP multicast flow is forwarded natively on the distribution network (e.g., from an IP Multicast enabled router) to an AP, and the AP replicates and forwards the multicast flow to a plurality of domains on the wireless network.

15 Claims, 4 Drawing Sheets

US 8,611,270 B1

DYNAMIC WIRELESS VLAN IP MULTICAST DISTRIBUTION

BACKGROUND

Wireless local area network (WLAN) Internet Protocol (IP) Multicast traffic flow is forwarded to IEEE (Institute of Electrical and Electronic Engineers) 802.11 compatible access points (APs) via statically configured Virtual Local Area Networks (VLANs). The APs are statically configured on both the wired side (e.g., a port coupled to a distribution network) and the wireless side. However, statically configured APs are not scalable and as the size of the network grows configuring the APs can be a burden to network administrators.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is described herein an apparatus, comprising a wireless transceiver operable for wireless communication, a communications interface operable for communicating with a distribution network, and a controller coupled to the wireless transceiver and the communications interface and operable for controlling the operation of the wireless transceiver and communications interface. The controller is configured to maintain a table associating a first broadcast domain and a second broadcast domain with a multicast stream. The controller is responsive to receiving a multicast stream from the distribution network via the communications interface to determine the first broadcast domain and the second broadcast domain are subscribing to the multicast stream. The controller is responsive to determining the first broadcast domain and the second broadcast domain are subscribing to the multicast stream to replicate and send the multicast stream separately to the first broadcast domain and the second broadcast domain via the wireless transceiver.

In an example embodiment, there is described herein a method comprising maintaining a table associating a first broadcast domain and a second broadcast domain with a multicast stream, receiving a multicast stream, and determining via the table the first broadcast domain and the second broadcast domain are subscribing to the multicast stream. The multicast stream is replicated and sent on the first broadcast domain and on the second broadcast domain.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate examples of the present invention, and together with the description serve to explain the principles of the invention.

DESCRIPTION OF EXAMPLE EMBODIMENTS

Figure 1:
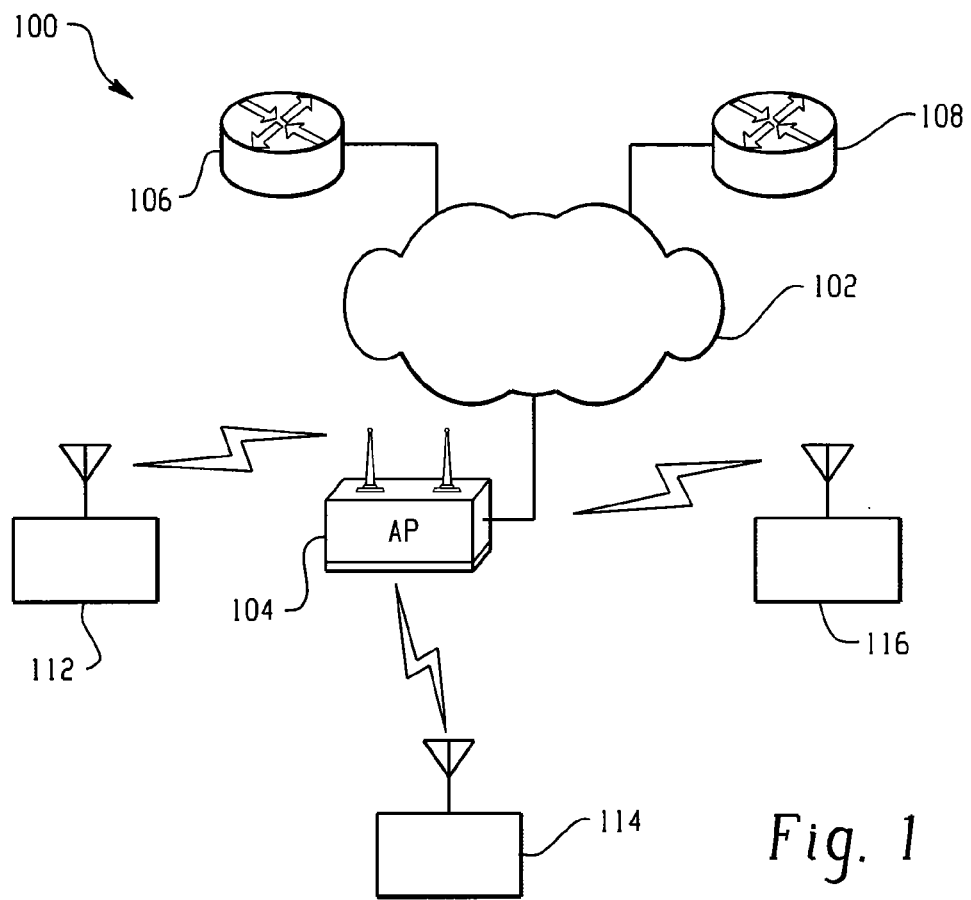
FIG. 1 illustrates an example of a network.

This description provides examples not intended to limit the scope of the invention, as claimed. The figures generally indicate the features of the examples, where it is understood and appreciated that like reference numerals are used to refer to like elements.

Described herein is a system and method that employs IGMP (Internet Group Management Protocol) snooping and client tracking to forward an IP multicast flow between a distribution (e.g., wired or backbone) network and a wireless network without the need to configure a VLAN on either infrastructure. A single IP multicast flow and IGMP are forwarded natively on the distribution network (e.g., from an IP Multicast enabled router) to an AP, and the AP replicates and forwards the multicast flow to a plurality of domains on the wireless network.

When wireless clients associate to an AP, a VLAN is created dynamically on the wireless domain associated with the wireless client according to data received from a RADIUS (Remote Access Dial-In User Service) server. The AP maintains a table comprising the wireless clients and domains associates with the wireless clients. When the AP intercepts an IGMP packet (e.g., an IGMP report sent by a wireless client), the IP Multicast subscription information, such as the IP Multicast Group, software port, and Dynamic VLAN assigned to the client are recorded by IGMP Snooping software into an IGMP snooping database. The IGMP packet is then redirected from the dynamic wireless VLAN to the native VLAN and forwarded to the appropriate router. Therefore, no static VLAN configuration is needed anywhere.

The AP uses the collected information to create a forwarding record for each IP Multicast flow. These records are used by an AP to replicate an IP Multicast packet received from the distribution network (e.g. from an Ethernet port) to the VLANs on the wireless ports. A single IP Multicast data packet is replicated to all dynamic VLANs with clients subscribing to the IP multicast flow.

FIG. 1 illustrates an example of a network 100. The network comprises a distribution network 102. The distribution network may be referred to as a 'wired' network, however those skilled in the art should readily appreciate that the distribution network may be a wireless network, such as a mesh network, or comprise both wired and wireless segments. Access point (AP) 104 is coupled to distribution network 102. The connection to distribution network may be referred to as the 'wired' connection or the Ethernet port. Access point 104 enables wireless clients (e.g. mobile devices, such as computing devices), such as for example wireless clients 112, 114, 116, to communicate with distribution network 102. Signals sent on distribution network 102 for one of wireless clients 112, 114, 116 are received by access point 104 which then wireless transmits the signals to the wireless clients. Signals from one of wireless clients 112, 114, 116 are received wirelessly by access point 104 and access point 104 forwards the signals onto distribution network 104. Network 100 may comprise any physically realizable number of access points and any physically realizable number of wireless clients may be associated with the access points, and thus the number of access points and/or wireless clients should not be construed as limited by the numbers illustrated on FIG. 1 as FIG. 1 is merely for illustration purposes.

Router 106 couples an external virtual local area network (VLAN) to network 102. Router 106 can be referred to as a last hop multicast router as it is the router closest to AP 104 (for example if there were additional routers between the external VLAN and network 102 router 106 would be the last router a packet sent from the external VLAN would pass before reaching network 102).

Central Switch 108 coupled AP 104 to external devices for performing authentication. For example, central switch 108 can be coupled to an authentication server, such as a RADIUS (remote dial-in user service) server. Alternatively, central switch 108 can be coupled to a wireless domain controller which may function as a proxy authentication server for AP 104.

In an example embodiment, AP 104 maintains a table associating broadcast domains with multicast streams. For example, client 112 can belong to a first broadcast domain and client 114 can belong to a second broadcast domain, client 116 can belong to either the first broadcast domain, second broadcast domain or a third broadcast domain. Each broadcast domain can be associated with one or more multicast streams, and wireless clients of different domains may even subscribe to the same streams. For example, the broadcast domain may be used for teachers at a university while the second broadcast domain is used by students at the university. Each broadcast domain receives its multicast streams separately. However, wireless clients of the first broadcast domain and second broadcast domain may also be subscribing to the same multicast stream. Thus, for example, when a multicast stream is received by AP 104, AP 104 uses the lookup table to determine which broadcast domains are subscribing to the multicast stream and replicates the multicast stream accordingly. The multicast stream is sent wirelessly on each broadcast domain.

For example, if wireless client 112 belongs to a first broadcast domain and wireless client 114 belong to a second broadcast domain that are both subscribing to a multicast stream, when AP 104 receives a packet for the multicast stream, AP 104 would then determine which broadcast domains are subscribing to the stream (the first broadcast domain associated with client 112 and the second broadcast domain associated with client 114 in this example). AP 104 would then replicate the packet and send the packet wirelessly on the first wireless domain and would also send the packet wirelessly on the second wireless domain.

In an example embodiment, AP 104 is configured to intercept signals from a wireless client (e.g. any of wireless clients 112, 114, 116) requesting a new multicast stream. AP 104 is responsive to receiving the signal to update the table to associate the appropriate broadcast domain with the new multicast stream. For example, if wireless client 112 were to wirelessly send a request through AP 104 for a new multicast stream, AP 104 would intercept the request and update its table for associating multicast streams. AP 104 would then forward the request to the appropriate entity via network 102.

For example, wireless client 112 may belong to a first wireless domain which is a virtual local area network VLAN). If wireless client 112 wants to receive a new IP multicast stream from any IP multicast source or network behind router 106, wireless client 112 could send an IGMP (Internet Group Management Protocol) or IGMP compatible request via AP 104. AP 104 would update a table it maintains for multicast stream forwarding and forward the request to router 106. The new multicast stream from an IP multicast source would be routed via router 106 to network 102 where it would be received by AP 104, which would then determine from the multicast stream forwarding table that wireless client 112 should receive the stream and transmit the stream to wireless client 112 accordingly. AP 104 routes the request to the native VLAN. In an example embodiment, AP 104 can dynamically create a local VLAN for the new IP multicast stream.

In an example embodiment, encryption keys (e.g. group and/or broadcast encryption keys) are employed to segregate broadcast domains on the wireless side of AP 104. For example, a first encryption key can be used for the first broadcast domain and a second broadcast key can be used for the second broadcast domain. Optionally, a third encryption key can be used by AP 104 for encrypting and/or decrypting traffic sent on network 102.

In an example embodiment, AP 104 is configured to dynamically create local virtual local area networks (VLANs) for broadcast domains, for example for wireless clients 112, 114, 116. For example, when wireless client 112 associates with AP 104, AP 104 receives profile information from switch 108 for wireless client 112. The profile information can suitably comprise a broadcast domain (e.g. a VLAN) for wireless client 112. If AP 104 does not have a local VLAN corresponding to a broadcast domain (VLAN) in wireless client 112's profile, AP 104 creates a new VLAN. The table maintained by AP 104 is updated to map the VLAN for wireless client 112 to the dynamically created VLAN. When wireless client 114 associates with AP 104, if it belongs to a different (second) broadcast domain than wireless client 112, AP 104 dynamically creates a second new VLAN local to AP 104 for wireless client 114, and would update the table to associate wireless client 114 to the second new VLAN.

In an example embodiment, the lookup table for AP 104 stores one or more associations between wireless clients, broadcast domains and wireless clients. For example, the lookup table may suitably comprise data associating a virtual local area network communicatively wirelessly coupled to AP 104 to a multicast stream. As another example, the lookup table may suitably comprise data associating a multicast stream to a mobile node communicatively coupled with AP 104 wirelessly. Yet another example, the table may suitably comprise data associating a mobile node communicatively coupled wirelessly to AP 104 with a multicast stream.

Figure 2:
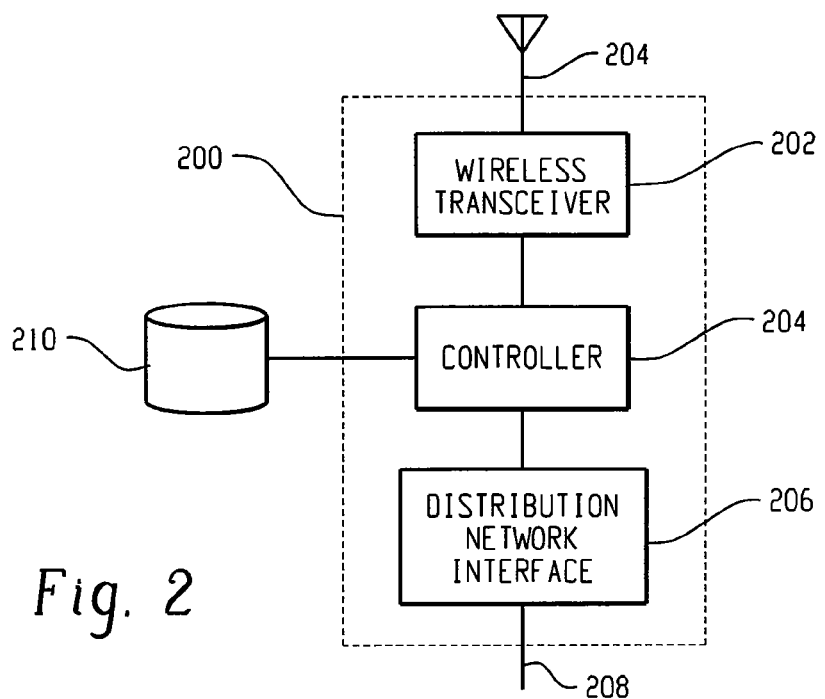
FIG. 2 illustrates an example of an access point.

FIG. 2 illustrates an example of an access point (AP) 200. Access point 200 is suitable to implement the functionality described for access point 104 (FIG. 1). AP 200 comprises a wireless transceiver 202 operable for wireless communication. Wireless transceiver 202 may suitably comprise an antenna 204 for transmitting and receiving wireless signals. Wireless transceiver 202 can have circuits for amplification, modulation/demodulation, frequency conversion, digital to analog (D/A), analog to digital (A/D), etc.

Controller 204 is coupled to wireless transceiver 202. Controller 204 is operative to control the operation of wireless transceiver 202. Controller 204 comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Controller 204 is configured to acquire data from wireless signals received by wireless transceiver 202. Controller 2 is also configured to send data to wireless transceiver 202 for wireless transmission.

Distribution network interface 206 is coupled to controller 204 and is employed to couple AP 200 to a distribution network. Controller 204 is operative to controls the operation of distribution network interface 206. For example, referring to AP 104 in FIG. 1, wireless transceiver 202 is employed for wirelessly communicating with wireless (mobile) clients, such as clients 112, 114, 116, and distribution network interface 206 is coupled to network 102 via a coupler 208. If AP 200 is coupled to the distribution network via a wired connection (e.g. Ethernet), then coupler 208 could be a wired connection such as an Ethernet cable. If AP 200 is coupled wirelessly to the distribution network (e.g. the distribution network is a Mesh network), then coupler 200 can be an antenna suitably adapted for sending and receiving wireless signals.

Table 210 is maintained by controller 204. Table 210 is used by controller 204 to store data associating traffic from the distribution network that is sent and/or received, on distribution network interface 206 with traffic that is send and/or received via wireless transceiver 202. For example, table 210 can store associations between broadcast domains in communication with wireless transceiver 202 with IP multicast streams in communication with distribution network interface 206.

In an example embodiment, controller 204 is responsive to receiving an IP multicast stream from the distribution network via network interface 206 to determine that wireless clients of a first broadcast domain and a second broadcast domain are subscribing to the IP multicast stream via lookup table 210. Controller 204 is responsive to determining the wireless clients of first broadcast domain and the second broadcast domain are subscribing to the IP multicast stream to replicate and send the multicast stream separately to the first broadcast domain and the second broadcast domain via wireless transceiver 202.

In an example embodiment, controller 204 is operative to intercept a signal from a wireless client associated with the first wireless domain received by wireless transceiver 204 requesting a second multicast stream. Controller 204 is responsive to intercepting the signal requesting the second multicast stream to update table 210 to associate the wireless client, the first broadcast domain, or both with the second multicast stream. Controller 204 is operable to forward the request for the second multicast stream via the communications interface 206 onto the distribution network.

As an example of the aforementioned example embodiment, wireless transceiver 202 receives a request (such as an IGMP join) from a wireless client belonging to a broadcast domain that is communicatively coupled to wireless transceiver 202 to subscribe to an IP Multicast stream. The request is forwarded by wireless transceiver 202 to controller 204. Controller 204 updates table 210 to associate the requesting wireless client (or the broadcast domain associated with the wireless client) with the IP Multicast stream. Controller 204 forwards the request to the native VLAN via distribution network interface 206 onto the distribution network. Controller 204 may optionally create a local VLAN for the IP multicast stream.

In an example embodiment, broadcast domains (e.g. VLANs) associated with wireless transceiver 202 are segregated by encryption keys, such as group and/or broadcast encryption keys. For example, if there are two broadcast domains, the first broadcast domain has a first broadcast encryption key and the second broadcast domain has a second broadcast encryption key. Optionally, a third broadcast encryption key can be used for either encrypting and/or decrypting the multicast stream that is sent or received on the distribution network by distribution network interface 206.

In an example embodiment, controller 204 is configured to dynamically create VLANs as new broadcast domains are associated with wireless transceiver 202. For example, a first virtual local area network (VLAN) is created for a first broadcast domain responsive to associating with a first wireless client belonging to the first broadcast domain communicatively coupled to wireless transceiver 202, and a second VLAN is created for a second broadcast domain responsive to associating with a second wireless client that belongs to the second wireless domain communicatively coupled to wireless transceiver 202. In an example embodiment, controller 204 is responsive to creating the first VLAN to update table 210 to associate the first wireless client with the first VLAN and controller 204 is responsive to creating the second VLAN to update table 210 to associate the second wireless client with the second VLAN.

Table 210 is suitably adapted for maintaining associates between one or more of clients (e.g. MAC addresses), VLANs and mobile nodes. For example, table 210 may suitably maintain data associating a virtual local area network communicatively coupled with the wireless transceiver 202 to a multicast stream communicatively coupled to distribution network interface 206, data associating a multicast stream communicatively coupled to distribution interface 206 to a mobile node (wireless client) communicatively coupled with the wireless transceiver 202, and data associating a mobile node (wireless client) communicatively coupled to the wireless transceiver 202 with the multicast stream communicatively coupled to distribution network interface 206.

Figure 3:
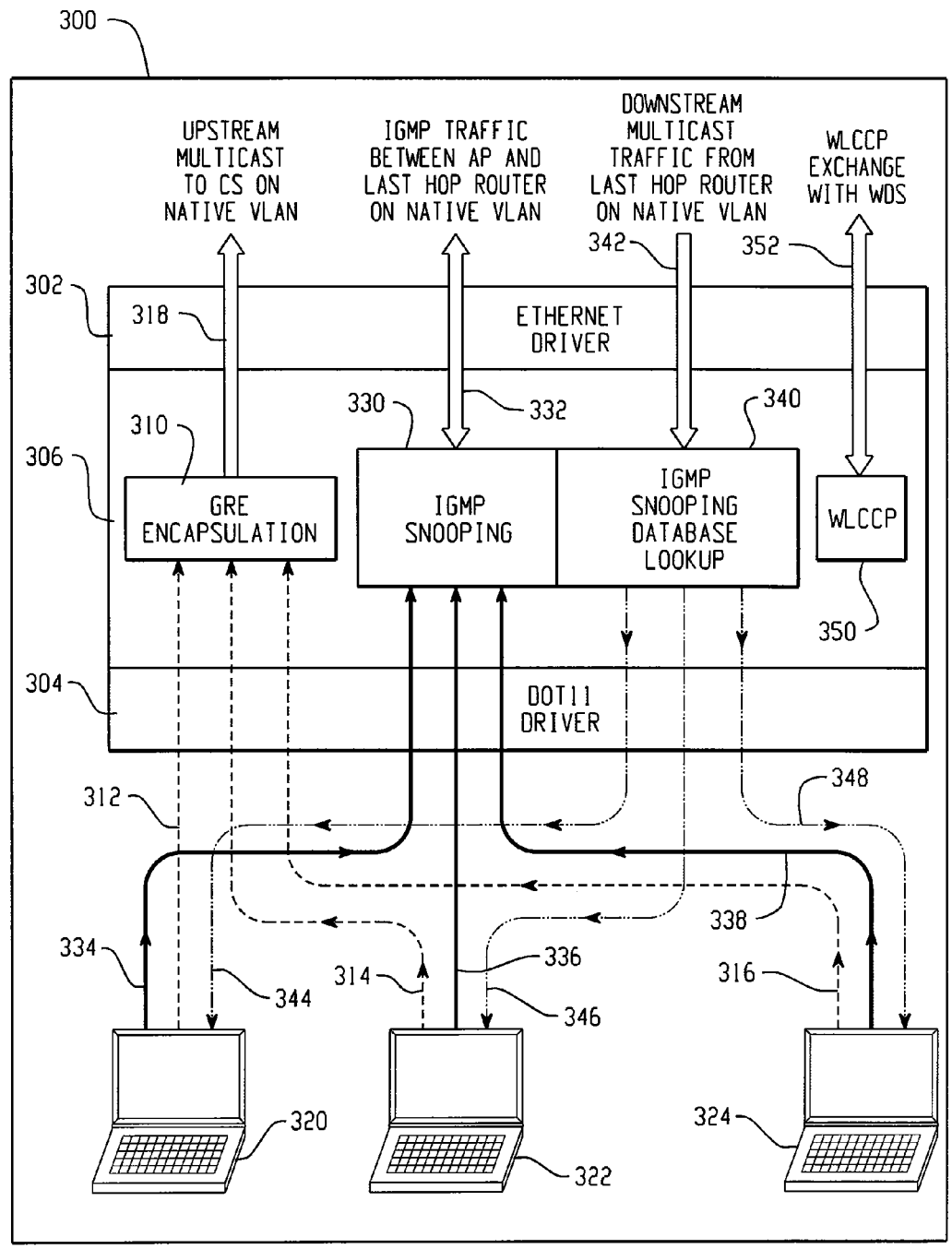
FIG. 3 illustrates an example of the overall multicast supporting structure and traffic flow of AP software.

FIG. 3 illustrates an example of the overall multicast supporting structure 300 and traffic flow of AP software and/or logic. The supporting structure can be employed by AP 104 (FIG. 1) and/or AP 200 (FIG. 2). In an example embodiment, support structure 300 is implemented by controller 204 (FIG. 2). Structure 300 suitably comprises an Ethernet Driver 302 (logic for communicating with the distribution network), a driver for communicating with wireless clients (e.g. an 802.11 driver) and logic 306 coupling the Ethernet Driver and the driver for communicating with wireless clients. Logic 306 comprises a module (GRE Encapsulation) for sending upstream multicast data 318.

In the illustrated example, data from wireless clients 320, 322, 324 received in upstream flows 312, 314, 316 respectively is received by module 310 and forwarded via stream 318. IGMP traffic between the AP and the last hop router (e.g. AP 104 and router 106 in FIG. 1) is sent and received via a bi-directional flow 332 via IGMP snooping module 330.

IGMP snooping module 330 intercepts IGMP requests from wireless clients 320, 322, 324 represented by streams 334, 336, 338 respectively and forwards IGMP requests (such as a join) to the last hop router on the native VLAN. IGMP snooping module 330 also responds to queries from the last hop native VLAN router, which may or may not be directed to one or more of wireless clients 320, 322, 324. IGMP snooping module 330 is coupled to IGMP snooping database lookup module 340. IGMP snooping module 340 is responsive to intercepting IGMP traffic to update IGMP snooping database lookup 340.

Downstream multicast traffic 342 (e.g. traffic from a last hop router on a native VLAN) is processed by IGMP snooping database lookup 340. IGMP snooping database 340 receives downstream multicast traffic 342 and determined which broadcast domains (or wireless clients) are to receive the traffic. IGMP snooping database 340 comprises logic for replicating the traffic and sending the traffic to the appropriate broadcast domains. In the illustrated example, multicast traffic 342 is replicated and sent via streams 344, 346, 348 to wireless clients 320, 322, 324 respectively.

Module 350 communicates via bidirectional stream 350 with devices disposed on the distribution network for security and administrative functions. For example module 350 can implement WLCCP (Wireless LAN Context Communication Protocol available from Cisco Systems, Inc), 170 West Tasman Drive, San Jose, Calif. 95134 for providing network security by communicating with authentication servers or wireless domain controllers disposed on the distribution network. For example, module 350 can be employed to authenticate wireless clients 320, 322, 324 with either a RADIUS server or a wireless domain server. Upon successful authentication, module 350 may receive profile information for wireless clients 320, 324 and 324. The profile data can be used to update IGMP snooping database lookup module 340.

Figure 4:
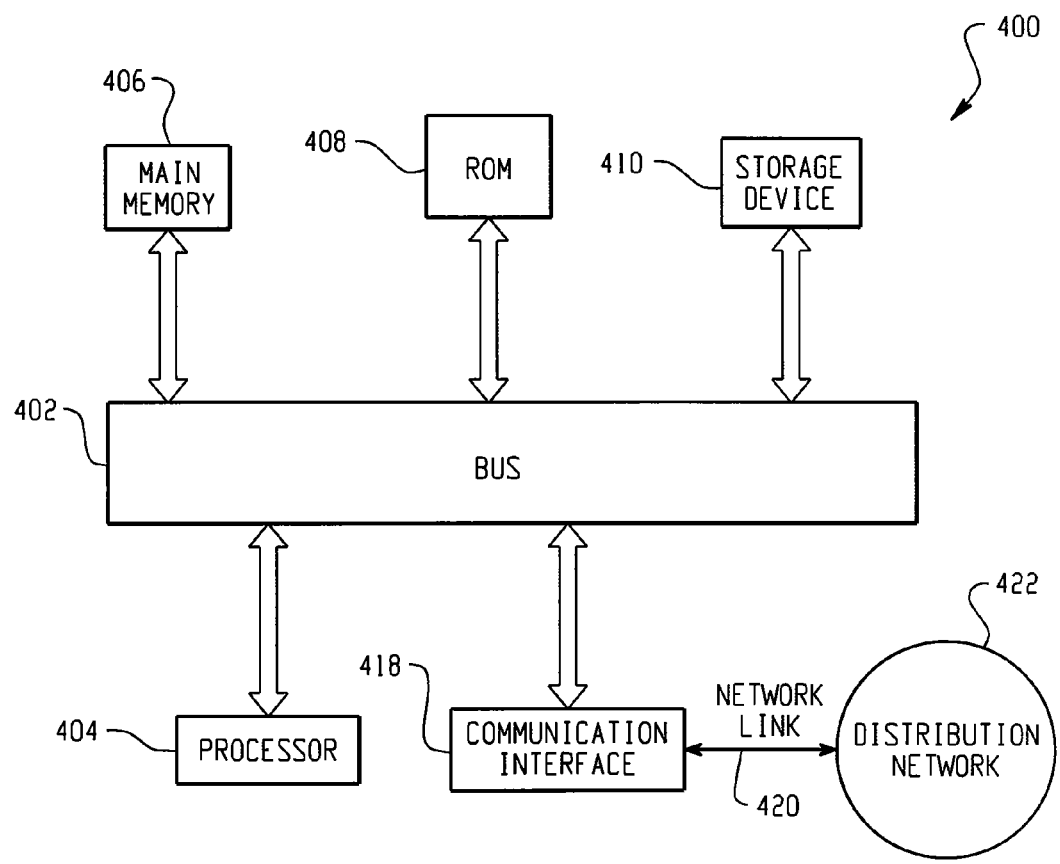
FIG. 4 illustrates an example of a computer system for implementing the functionality of an AP as described herein.

FIG. 4 is a block diagram that illustrates a computer system 400 upon which an embodiment of the invention may be implemented. For example, computer system 400 is capable of implementing the functionality described herein for AP 104 (FIG. 1), controller 204 (FIG. 2), and or support structure 300 (FIG. 3).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 can be used for implementing a dynamic wireless VLAN with multicast streaming. According to one embodiment, dynamic wireless VLAN with multicast streaming is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a distribution network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. Computer system 400 can send messages and receive data, including program codes, through associated network(s), network link 420, and communication interface 418.

Figure 5:
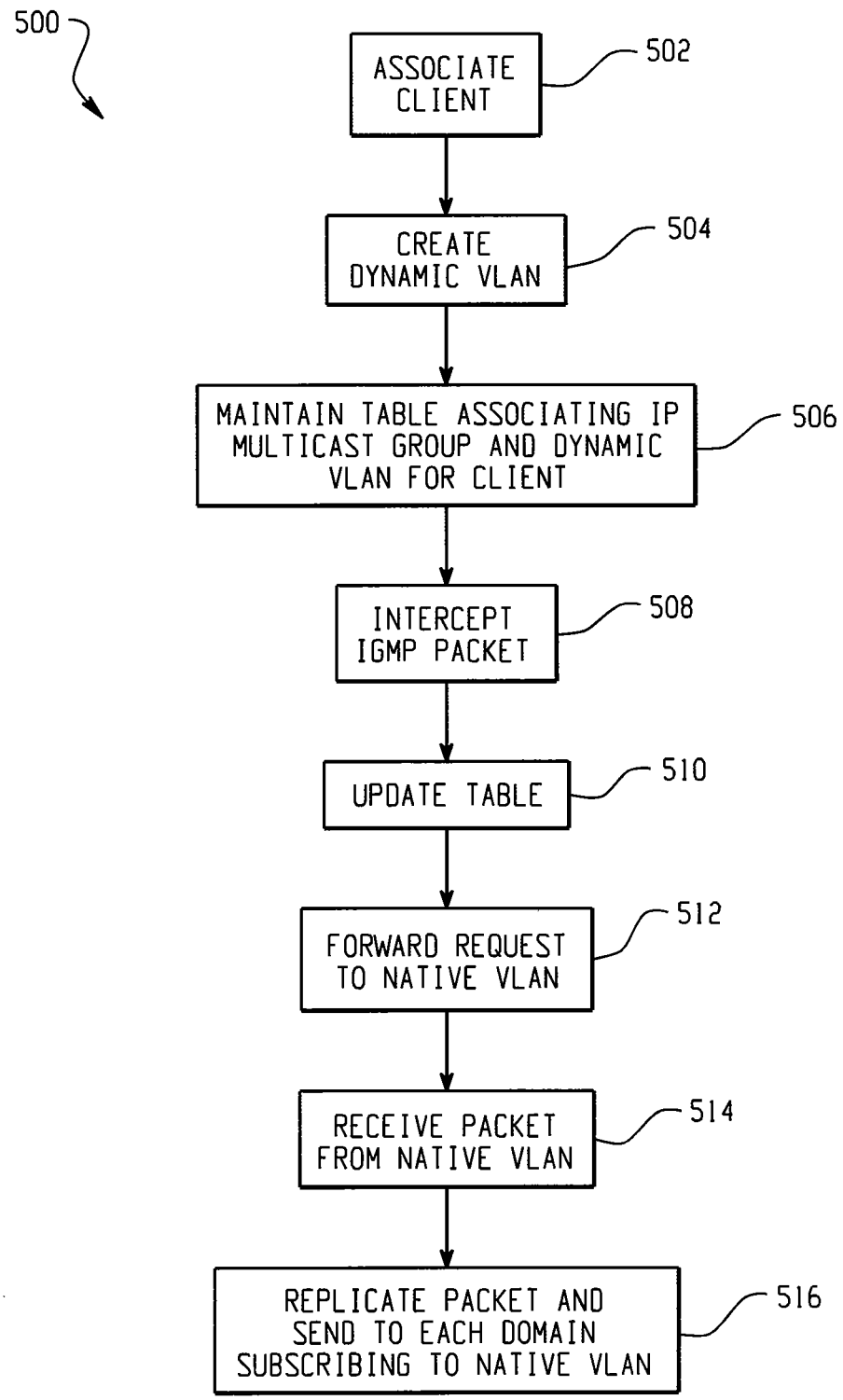
FIG. 5 illustrates an example of a method for servicing a multicast stream employing dynamically created broadcast domains.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 5 illustrates an example of a method 500 for implanting dynamic wireless VLAN with multicast streaming. At 502, a wireless client (mobile node) associates with an access point. Authentication with the network and key exchanges between the wireless client and access point may also be performed.

At 504, a broadcast domain (e.g. a dynamic wireless VLAN) is created for the wireless client. This would occur if the client belongs to a broadcast domain that is currently not configured at the access point. If the broadcast domain (e.g. wireless VLAN) already exists at the access point, the wireless client is then associated with the existing broadcast domain.

At 506, a table is maintained for associating multicast streams (e.g. an IP multicast group) with local broadcast domains (e.g. dynamic wireless VLANs) for wireless clients associated with the access point. The table is updated whenever wireless clients associate or de-associate with the access point. For example, when a wireless client associates with an access point belonging to a broadcast domain not already configured at the access point (e.g. a VLAN), the access point dynamically creates the local broadcast domain (e.g. VLAN) and updates the table associating the wireless client with the broadcast domain. Examples of associations that may be stored in the table include but are not limited to associating a VLAN with a multicast stream, associating a multicast stream with a mobile node, and associating a mobile node with multicast streams. The associations may also be plural, for example more than one local VLAN or mobile node can be associated with a multicast stream, or a mobile node can be associated with multiple multicast streams.

At 508, the access point intercepts requests to receive a multicast stream, such as an IGMP join from a mobile node requesting an IP multicast stream. At 510, the AP updates the table. If the request is for a multicast stream not already associated with the access point, then the access point can dynamically create a new broadcast domain, such as a VLAN for the new stream.

At 512, the access point forwards the request for the multicast stream to the appropriate destination on the distribution network for processing. In the example of a VLAN request, the access point forwards the request to the native VLAN for the multicast stream. If the request has a non-native VLAN identifier, the access point can strip off the non-native VLAN identifier and replace it with the native VLAN identifier. This allows multiple broadcast domains associated with the access point to receive the multicast stream, while only one multicast stream is received from the native VLAN (e.g. the last hop router), providing the benefit of less network traffic.

At 514, the access point receives a packet associated with a multicast stream (e.g. an IP multicast stream) from the native VLAN (e.g. the last hop router). Based on data maintained in the table by the access point, the access point can determine the broadcast domains subscribing to the multicast stream. At 516, the access point replicates the inbound stream and forwards it to each of the subscribing broadcast domains. For example if two broadcast domains associated with the wireless port (e.g. local VLANs) are subscribing to an IP Multicast domain, the packet is received in a single multicast stream from the distribution network (e.g. from the last hop router), replicated, and sent to each broadcast domain. If, for example, each broadcast domain is using a separate encryption key, then the stream is sent once with each encryption key, for example for two broadcast domains the stream is sent once over the wireless port employing the first encryption key and once over the wireless port employing the second encryption key. Optionally, the stream can be encrypted and/or decrypted by a unique (e.g. a third) encryption key on the port (e.g. wired Ethernet, Mesh Backhaul) associated with the distribution network.

An aspect of the embodiments described herein is that all IP Multicast data and control traffic are forwarded natively on the network infrastructure. This obviates the need to statically configure VLANs, reducing administration overhead and errors from manually entering data. Only a single copy of an IP Multicast flow is sent from a VLAN router to an AP, which the AP replicates and transmits to all subscribed dynamic VLANs, reducing traffic on the network infrastructure, thus saving bandwidth. RADIUS assigned dynamic wireless VLANs can transparently receive an IP Multicast flow from an IP Multicast router natively through the network infrastructure. An IGMP snooping database supports per IP Multicast Group and per VLAN based centralized policy to facilitate control of Multicast traffic distribution from a central switch. Moreover, the dynamic VLANs described herein are compatible with statically configured VLANs and can co-exist and run on an AP at the same time.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transceiver operable for wireless communication with a wireless domain;
a communications interface operable for communicating with an associated distribution network; and
a controller operatively coupled with the wireless transceiver and the communications interface and operable for controlling operation of the wireless transceiver and the communications interface;
wherein the controller maintains a table associating wireless clients with broadcast domains in the wireless domain and for associating the broadcast domains in the wireless domain with multicast flows on the associated distribution network that is used for replicating the multicast flows received from the associated distribution network to send to select corresponding broadcast domains in the wireless domain;
wherein the controller obtains from the associated distribution network a profile for a first wireless client comprising data representative of a first broadcast domain in the wireless domain for the first wireless client;
wherein the controller creates a dynamic broadcast domain in the wireless domain corresponding to a broadcast domain on the associated distribution network in the profile for the first wireless client responsive to determining that the controller does not have an entry in the table matching the first broadcast domain in the wireless domain corresponding to the broadcast domain on the associated distribution network in the profile for the first wireless client;

wherein the controller updates the table to associate the first wireless client with the dynamic broadcast domain in the wireless domain;

wherein the controller obtains from the associated distribution network a profile for a second wireless client comprising data representative of a second broadcast domain in the wireless domain for the second wireless client;

wherein the controller updates the table to associate the second wireless client with the dynamic broadcast domain in the wireless domain responsive to determining that the controller has the entry in the table for the broadcast domain in the wireless domain corresponding to the broadcast domain on the associated distribution network in the profile for the second wireless client; and, wherein the controller replicates a single multicast flow from the associated distribution network and the replicated multicast flow to the first wireless client and the second wireless client via the dynamic broadcast domain in the wireless domain.

2. An apparatus according to claim 1, wherein:

the controller intercepts a signal from the first wireless client associated with the first broadcast domain in the wireless domain via the wireless transceiver requesting a second multicast flow;

the controller is responsive to intercepting the signal requesting the second multicast flow to update the table to associate one of a group consisting of the first wireless client and the dynamic broadcast domain in the wireless domain with the second multicast flow; and, the controller forwards the signal representing the second multicast flow onto the associated distribution network.

3. An apparatus according to claim 2, wherein the dynamic broadcast domain in the wireless domain is a virtual local area network, the second multicast flow is an Internet Protocol multicast stream and the request for the second multicast flow is an Internet Group Management Protocol compatible request.

4. An apparatus according to claim 3, wherein the request for the second multicast flow is forwarded on the associated distribution network addressed to a native virtual local area network for the second multicast flow.

5. An apparatus according to claim 2, wherein the controller is responsive to dynamically create a second dynamic local virtual local area network in the wireless domain for the second multicast flow.

6. An apparatus according to claim 1, wherein the dynamic broadcast domain in the wireless domain has a first encryption key and a second dynamic broadcast domain in the wireless domain has a second encryption key.

7. An apparatus according to claim 6, wherein a third encryption key is used for one of a group consisting of encrypting and decrypting the multicast flow on the associated distribution network.

8. An apparatus according to claim 1, further comprising the controller is operative to create a first virtual local area network (VLAN) for the dynamic broadcast domain in the wireless domain responsive to associating with a first wireless client belonging to the dynamic broadcast domain in the wireless domain.

9. An apparatus according to claim 8, further comprising the controller is responsive to creating a VLAN to update the table to associate the first wireless client with the VLAN.

10. A method, comprising:

maintaining a table associating wireless clients with broadcast domains in a wireless domain and multicast streams with broadcast domains in an associated distribution network;

associating a first wireless client communicating on a wireless domain via a wireless transceiver;

obtaining profile data of the first wireless client from an associated distribution network, the profile data including data representative of a first broadcast domain in the wireless domain for the first wireless client;

determining, based on the profile data of the first wireless client, whether the table has an entry of a broadcast domain in the wireless domain matching the first broadcast domain in the wireless domain for the first wireless client;

creating a dynamic broadcast domain in the wireless domain corresponding to the first broadcast domain in the wireless domain for the first wireless client responsive to determining the table does not have the entry for the first broadcast domain in the wireless domain for the first wireless client;

updating the table to associate the first wireless client with the dynamic broadcast domain in the wireless domain responsive to associating the first wireless client;

associating a second wireless client communicating on the wireless domain via the wireless transceiver;

obtaining profile data of the second wireless client from the associated distribution network, the profile data including data representative of a second broadcast domain in the wireless domain for the second wireless client;

associating the dynamic broadcast domain in the wireless domain with a second broadcast domain in the wireless domain for the second wireless client responsive to determining the table has the entry for the second broadcast domain in the wireless domain for the second wireless client;

receiving a request for a new multicast stream from the first wireless client;

updating the table to associate the new multicast stream with the dynamic broadcast domain in the wireless domain responsive to the request;

redirecting the request onto a native broadcast domain on the associated distribution network addressed to a native static VLAN (Virtual Local Area Network);

receiving the new multicast stream from the native static VLAN;

determining via the table that the dynamic broadcast domain in the wireless domain is subscribing to the new multicast stream; and replicating the new multicast stream and sending the replicated multicast stream to the first wireless client and second wireless client via the dynamic broadcast domain in the wireless domain responsive to determining the dynamic broadcast domain in the wireless domain is subscribing to the new multicast stream.

11. A method according to claim 10, further comprising:

intercepting a signal from a third wireless client associated with the dynamic broadcast domain in the wireless domain requesting a second multicast stream;

updating the table to associate one of the group consisting of the third wireless client and the dynamic broadcast domain in the wireless domain with the second multicast stream; and forwarding the request for the second multicast stream via the wireless transceiver onto the associated distribution network.

12. A method according to claim 11, wherein the request is forwarded to the native VLAN associated with the second multicast stream.

13. A method according to claim 11, wherein the dynamic broadcast domain in the wireless domain is a VLAN, the second multicast stream is an Internet Protocol multicast stream, and the request for a second multicast stream is an Internet Group Management Protocol compatible request.

14. A method according to claim 10, further comprising:
dynamically creating a first VLAN for the dynamic broadcast domain in the wireless domain responsive to associating a first wireless client belonging to the dynamic broadcast domain in the wireless domain.

15. A method according to claim 10, further comprising:
decrypting the new multicast stream with a decryption key;
encrypting the new multicast stream on the dynamic broadcast domain in the wireless domain with a first encryption key; and
encrypting the new multicast stream on a second dynamic broadcast domain in the wireless domain with a second encryption key.

\* \* \* \* \*